(12) United States Patent
Flemons

(10) Patent No.: US 6,508,484 B1
(45) Date of Patent: Jan. 21, 2003

(54) BICYCLE PROTECTOR

(76) Inventor: David Lee Flemons, 2 Old Winch Hill Cottages, Winch Hill, NR Wandon End, Herts (GB)

( * ) Notice: Subject to any disclaimer, the term of this patent is extended or adjusted under 35 U.S.C. 154(b) by 0 days.

(21) Appl. No.: 09/484,382

(22) Filed: Jan. 14, 2000

(51) Int. Cl.[7] ................................................ B62J 19/00
(52) U.S. Cl. .................. 280/304.3; 296/78.1; 206/335; 150/167; 135/88.04
(58) Field of Search ........................... 280/304.3, 288.4; 296/78.1, 136; 206/335, 315.1; 150/167, 166; 224/156; 135/88.03, 88.04

(56) References Cited

U.S. PATENT DOCUMENTS

| | | | | |
|---|---|---|---|---|
| 3,659,872 A | * | 5/1972 | Warner | 296/78.1 X |
| 3,968,913 A | * | 7/1976 | Weed et al. | 296/78.1 X |
| 4,283,084 A | * | 8/1981 | Gallagher | 296/78.1 |
| 4,598,725 A | * | 7/1986 | Brewer | 135/95 |
| 4,715,646 A | * | 12/1987 | Goffi et al. | 296/136 |
| 4,756,416 A | * | 7/1988 | Johnson | 206/335 |
| 4,944,340 A | * | 7/1990 | Tortorich | 150/167 |
| 5,193,724 A | * | 3/1993 | Robbins | 150/167 X |
| 5,445,200 A | * | 8/1995 | Celestino et al. | 296/78.1 X |
| 5,562,139 A | * | 10/1996 | Cseri | 150/167 |
| 5,921,389 A | * | 7/1999 | Zoffer | 206/335 |
| 6,003,745 A | * | 12/1999 | Mechanic | 224/156 |

* cited by examiner

*Primary Examiner*—F. Zeender
(74) *Attorney, Agent, or Firm*—Galgano & Burke

(57) ABSTRACT

A bicycle protector which comprises a cushioning cover adapted to be draped over a wheeled bicycle to cover at least the bicycle frame from the right and left hand sides and having fastening means, to secure the cover in place by attachment to or around the bicycle or a part thereof, the cover being filled in use with a resilient cushioning material to protect the bicycle frame from damage in storage or transit.

14 Claims, 1 Drawing Sheet

BICYCLE PROTECTOR

RELATED APPLICATION

This application is a continuation-in-part of Application Ser. No. 09/109,577 filed Jul. 2, 1998 (now abandoned).

FIELD OF THE INVENTION

The present invention relates to a protector for bicycles which is adapted to provide protection to the bicycle from damage in storage or transit.

BACKGROUND TO THE INVENTION

Major advances in bicycle design and construction have been made in recent years in the light of the availability of new materials and technologies and spurred on by the burgeoning market for all-terrain bikes and the desire for ever lighter, faster and more robust models.

The popularity of mountain and cross-country biking has led to a great increase of bicycles in transit via public transport, and especially transported by air, to enable the cyclists to enjoy exploration of rugged terrain further afield. In view of the very substantial cost of many specialist bicycles and the high volume of traffic of transported bicycles there is an ever increasing demand for effective bicycle protection in transit.

Where suitable bicycle protectors are available, these generally comprise padded bags sized only to accommodate the frame of a bicycle or to also accommodate the wheels but only once the wheels have been demounted. Such protectors are inconvenient for a number of reasons, not least the fact that the padded bag occupies a very substantial volume when not required for use and is, therefore, a major handicap to the light traveller/cycle tourist.

Covers specifically suited for use with bicycles are described in U.S. Pat. No. 5,193,724 and European patent application number EP 0614827 A. Neither of these provides effective protection to the bicycle in transit.

Covers for motorbikes are described in various earlier patent application publications, including GB 693 392, GB 251,062, U.S. Pat. Nos. 5,562,139 and 4,283,084. Amongst these motorbike covers, however, only GB 251,062 has any form of padding and this is localised to cover the oil tank and seat of the leather motorbike cover. Accordingly, to the best of the applicant's knowledge, there is no prior design of protective cover for bicycles to provide efficient, effective and economical protection to the bicycle in transit.

SUMMARY OF THE INVENTION

According to the present invention there is provided a bicycle protector which comprises a cushioning cover that folds, in use, along a substantially centralised longitudinal or transverse axis to thereby drape over a wheeled bicycle to cover at least the bicycle frame from the right and left hand sides to a substantially equal extent and having fastening means, to secure the cover in place by attachment to or around the bicycle or a part thereof, the cover being filled in use throughout its extent with a cushioning material to protect the bicycle frame from damage in storage or transit, wherein the protector functions also as a camping mattress or accommodates, in at least one openable and closeable compartment at least one camping mattress or sleeping bag or other filing acting as cushioning material in use.

Where the cover has a single compartment the compartment may include the whole internal volume of the cover, there being no partitions.

The fastening means may comprise one or more slots or slits in the cover to fit over the seat post and/or handlebar stem or one or more straps and/or clips to fasten together around the bicycle or part thereof. If slots or salts are provided in the cover to fit over the seat post and/or handle bar stem then these will be positioned in the cover at suitable locations to fit over the seat post and or handle bar stem respectively. This embodiment of the invention is, however, unsuitable for use where the protective cover is adapted to accommodate one or a pair of sleeping bags or one or a pair of camping mattresses, unless the user is happy to make a corresponding slot or slit in their camping mattress.

The cover is preferably elongate and adapted to be fastened to or about the bicycle while draped with its longitudinal axis transverse to the longitudinal axis of the bicycle. This particularly suits dual functionality of the cover.

The protector particularly preferably has dual functionality—It functions also as a camping mattress or accommodates, in one, two or more compartments one or more (normally one or two) camping mattresses or sleeping bags acting as the cushioning material, in use.

Surprisingly and very usefully, a pair of one man sized camping mattresses extended and held side by side in a protector cover of the present invention provide an almost ideal spread to cover and protect the vulnerable frame parts of a bicycle when draped transversely to the bicycles longitudinal axis. Particularly desirable is the use of an inflating and more preferably resiliently self-inflating type of foam filled mattress.

The protector is far more compact when rolled up than the conventional cushioned bag and may readily, for example, be tied to the luggage carrier of the bicycle when not draped over the bicycle.

In one embodiment of the invention, the cover is fastened to the bicycle by straps at each end thereof that pass through the wheels of the bicycle. These may advantageously be tautened by the turning of the wheels. Alternatively and desirably the fastening straps at each end may be fastened to the respective wheel hubs and/or the frame to enable the bicycle to be free-wheeled into the cargo hold of an aircraft or other transporter. However, in this arrangement it is not so easy to align the cover properly.

The cover is suitably formed with at least its inner web that faces the bicycle, in use, of a relatively tear-resistant material that is relatively impervious to the oil on the bicycle's gear train. Such material may, for example, comprise rip-stop nylon.

Suitably the carrier is further adapted to incorporate a shoulder strap for carrying of the bicycle. Such a strap may suitably be fastened at one end to the handlebar stem and at the other end to the seat post.

BRIEF DESCRIPTION OF THE DRAWINGS

Preferred embodiments of the present invention will now be more particularly described, by way of example, with reference to the accompanying drawings, wherein.

DESCRIPTION OF THE PREFERRED EMBODIMENTS

Figure 1:
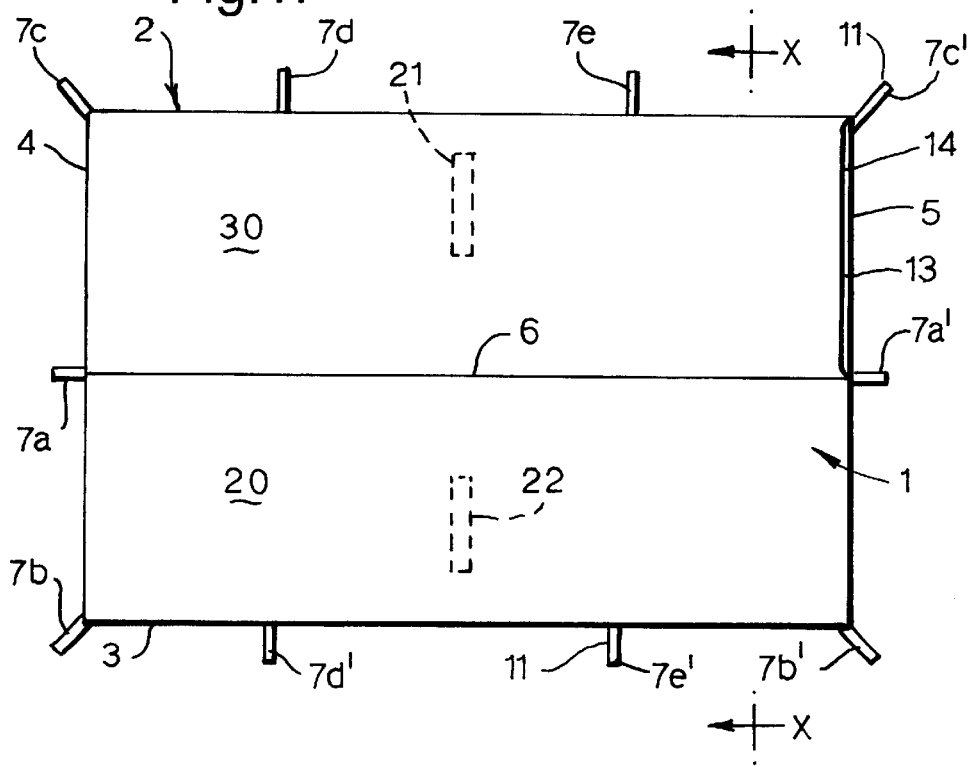
FIG. 1 is a plan view of a first preferred embodiment of bicycle protector of the present invention.
Figure 1A:
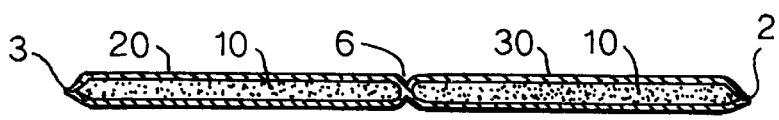
FIG. 1A is a transverse sectional view taken along the line X—X in FIG. 1.

Referring to FIG. 1, the bicycle protector illustrated comprises an elongate rectangular cushioning cover approximately five feet to six feet in length and three to four feet in width and formed of a pair of back-to-back rip-stop nylon sheets joined together along their opposing longitudinal edges 2, 3 and end edges 4, 5. A broad longitudinal seam 6 runs along the length of the cover 1 midway between the longitudinal edges 2, 3 and forms a spine dividing the interior of the cover 1 into two major longitudinal compartments 20, 30, each of which is subdivided into minor compartments which are air inflatable.

The compartments of the cover 1 are each filled with a resilient cushioning material 10 which may, for example, be a polyester foam and with each major compartment 20, 30 having a respective air inlet nozzle to permit inflation of the compartment. The thickness of the cushioning material is suitably of the order of three quarters inch to one inch (1.9 cm to 2.54 cm).

At each end and spaced along each side of each compartment there are further provided fastening straps 7a–e by means of which the cover 1 is secured to the bicycle in use. The straps are suitably arranged in opposing pairs around the periphery of the cover 1 and with each opposing pair having a buckle 11 on one of the pair to which the other strap of the pair may be tied.

Figure 2:
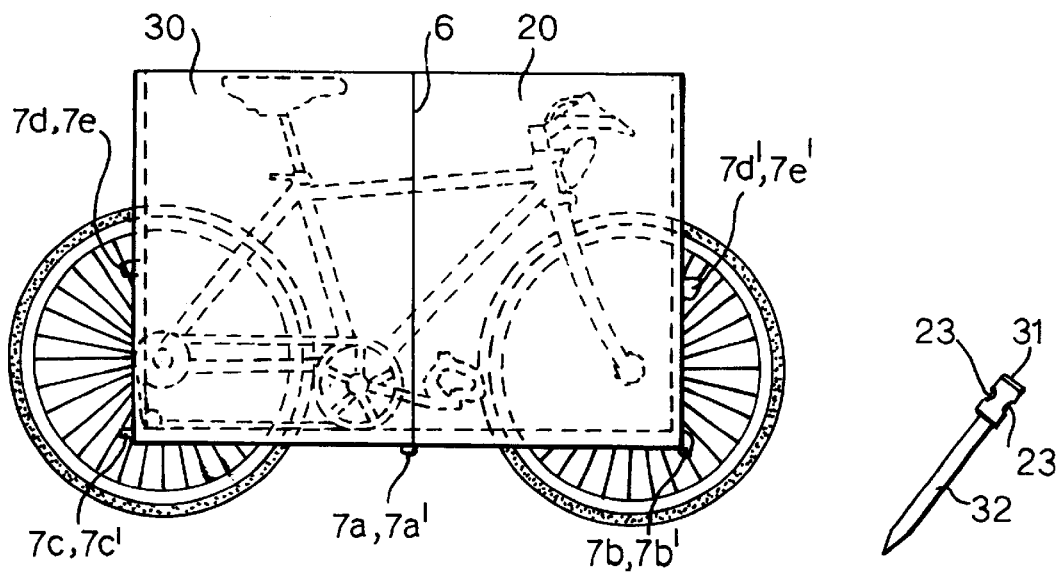
FIG. 2 is a perspective view of the protector of the FIG. 1 embodiment in use, installed upon a bicycle.

Referring to FIG. 2, the cover 1 is folded along a substantially centralised transverse axis, perpendicular to the longitudinal seam, and is draped over the bicycle resting upon the saddle and, depending on height adjustment, the handlebars. The respective ends of the cover 1 hang down over the right and left hand sides of the bicycle covering the framework and a substantial proportion of the wheels. Four fastening straps 7b–e are fastened through the wheels of the bicycle to prevent the cover 1 from inadvertently separating from the bicycle. This has the benefit of greater ease of alignment of the cover 1 and any turning of the wheels will tauten the straps. A further strap 7a, 7a$^1$ is suitably provided linking the end edges 4, 6 intermediate the two straps 7b, 7b' and 7c, 7c$^1$ a–d at each end to prevent any bulging of the cover 1 between the front and rear wheels of the bicycle.

In alternative, the cover may be secured in place to the bicycle by providing a respective strap to secure the cover to each of the front and rear wheel hubs by fastening the cover 1 to the wheel hubs the bicycle is capable of being free-wheeled to and from its point of storage.

Instead of providing straps or clips, or additionally, the cover 1 may be slitted or apertured at suitable locations 21, 22 to fit over the seat or handlebars, and preferably both.

To provide the user with greater flexibility in moving the bicycle around, a shoulder strap (not shown) is suitably provided that passes underneath the cover 1 and fastened, for example, at one end to the handlebar stem and at the other to the seat post. This carrying strap is suitably padded and is suitably adjustable in length.

In an alternative preferred embodiment the cover 1 instead of having a cushioning material sealed therein is formed with one or more openings to allow an external source of cushioning material to be inserted into the cover 1 when the cover 1 is required for use. Such external cushioning material may comprise a double sleeping bag or pair of single sleeping bags, for example. In the latter case, a cover 1 will be formed with two longitudinal major compartments as with the illustrated embodiment but with an opening 13 at an end of each compartment for insertion of the respective sleeping bag. Suitably in the case where a filling, such as a sleeping bag, is introduced into the cover 1 at time of use of the protector there is provided an opening 13 along at least part of one end edge 5 of the cover 1 and having a sliding clasp fastener 14, or other fastener, therealong to ensure that the filling is properly enclosed within the cover 1. The opening 13 with its fastener 14 may be positioned at other locations on the cover but the end edge 5 position is preferred.

Clearly where the cover 1 is intended to serve the function of a sleeping bag holder or have the dual function of serving as a camping mattress, it is extremely important to ensure that grease or oil from the bicycle is kept away from the sleeping face of the mattress or entirely away from any sleeping bag enclosed within the cover 1. Accordingly closability of the openings 13 is important and at least the face of the cover 1 adjacent the bicycle in use needs to be of an oil or grease and preferably also water impervious material that will not tear or puncture easily. Rip-stop nylon is one such material.

The protective cover of the present invention has great versatility and may be used for, amongst other purposes, a seat cover for use in a car or even a ground sheet for a tent. If it is to be used as a ground sheet for a tent there may be further accessories to be used with the cover. One such accessory is a double-sided buckle 31 (being the type which has a female portion with a socket having a releasable latch 23 on each side to latch onto a male portion) mounted to or integrally formed on a tent peg 32 and with the male part of the double sided buckle formed on one of the fastening straps 7 of the cover 1. Further accessories that may be used with the protective cover include, for example, bungees for attachment to the straps 7 or clips on the cover 1 and to be attached at their opposing ends to tent pegs.

It will be appreciated that numerous alternative embodiments are conceivable within the spirit and scope of the invention.

I claim:

1. A bicycle protector which comprises a cushioning cover that folds, in use, along a substantially centralized longitudinal or transverse axis from an extended completely flat unfolded state to a folded state which thereby drapes over a wheeled bicycle to cover at least the bicycle frame from the right and left hand sides to a substantially equal extent and having fastening means to secure the cover in place, the cover being entirely filled in use on both sides of the centralized longitudinal or transverse axis with a cushioning material to protect the bicycle frame from damage in storage or transit, wherein the protector accommodates, in at least one openable and closeable compartment, at least one insertable camping mattress or sleeping bag or other filling acting as the cushioning material in use.

2. A bicycle protector as claimed in claim 1 wherein the cover has a sliding clasp fastener at an opening of the compartment to enable the compartment to be opened and closed.

3. A bicycle protector as claimed in claim 1 wherein the compartment is openable and closable at an opening that is located at a longitudinal end edge of the cover.

4. A bicycle protector as claimed in claim 1 wherein the cover is substantially longer than it is wide and is in excess of four and a half feet in length and three feet in width and folds, in use, along a substantially centralised transverse axis.

5. A bicycle protector as claimed in claim 1 wherein the cushioning material is resilient.

6. A bicycle protector as claimed in claim 1, wherein the fastening means comprise one or more slots or slits in the cover to fit over the seat post and/or handlebar stem.

7. A bicycle protector as claimed in claim 1, wherein one or more straps and/or clips are provided on the cover to fasten together around the bicycle or part thereof.

8. A bicycle protector as claimed in claim 1, wherein the cover is elongate and adapted by virtue of its size and the location of the fastening means to be fastened to or about the bicycle most effectively while draped with its longitudinal axis transverse to the longitudinal axis of the bicycles.

9. A bicycle protector as claimed in claim 1 wherein the cushioning material comprises an inflating mattress.

10. A bicycle protector as claimed in claim 1, wherein the fastening means comprise clips or straps at or near the edges of the cover that pass through the wheels of the bicycle.

11. A bicycle protector as claimed in claim 1 wherein there is further provided a clip or strap intermediate the said clips or straps to prevent bulging of the cover in use.

12. A bicycle protector as claimed in claim 11, wherein the cover is formed with at least its inner web that faces the bicycle, in use, of a tear-resistant material that is impervious to the oil on the bicycle's gear train.

13. A bicycle protector as claimed in claim 1, wherein the protector is further adapted to incorporate a shoulder strap for carrying of the bicycle.

14. A bicycle protector as claimed in claim 9, wherein the inflating mattress is a resiliently self-inflating type of foam filled mattress.

* * * * *